(12) United States Patent
Savord

(10) Patent No.: US 8,177,718 B2
(45) Date of Patent: May 15, 2012

(54) LINEAR ARRAY ULTRASOUND TRANSDUCER WITH VARIABLE PATCH BOUNDARIES

(75) Inventor: Bernard Savord, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 932 days.

(21) Appl. No.: 12/280,727

(22) PCT Filed: Feb. 20, 2007

(86) PCT No.: PCT/IB2007/050544
§ 371 (c)(1),
(2), (4) Date: Aug. 26, 2008

(87) PCT Pub. No.: WO2007/099474
PCT Pub. Date: Sep. 7, 2007

(65) Prior Publication Data
US 2009/0171213 A1     Jul. 2, 2009

Related U.S. Application Data

(60) Provisional application No. 60/777,831, filed on Mar. 1, 2006.

(51) Int. Cl.
*A61B 8/00* (2006.01)
(52) U.S. Cl. ................... 600/447; 600/437; 600/444
(58) Field of Classification Search .......... 600/437–463; 73/628–632
See application file for complete search history.

(56) References Cited

U.S. PATENT DOCUMENTS

| | | | |
|---|---|---|---|
| 6,089,096 A * | 7/2000 | Alexandru | 73/626 |
| 6,375,617 B1 * | 4/2002 | Fraser | 600/443 |
| 6,436,048 B1 * | 8/2002 | Pesque | 600/447 |
| 6,468,216 B1 * | 10/2002 | Powers et al. | 600/443 |
| 6,471,650 B2 * | 10/2002 | Powers et al. | 600/447 |
| 6,471,652 B2 * | 10/2002 | Fraser et al. | 600/459 |
| 6,494,838 B2 * | 12/2002 | Cooley et al. | 600/443 |
| 6,497,663 B2 * | 12/2002 | Fraser et al. | 600/443 |
| 6,524,254 B2 * | 2/2003 | Erikson | 600/447 |
| 6,623,432 B2 * | 9/2003 | Powers et al. | 600/447 |
| 6,716,174 B1 * | 4/2004 | Li | 600/447 |
| 6,752,763 B2 * | 6/2004 | Erikson | 600/459 |
| 7,621,876 B2 * | 11/2009 | Hoctor et al. | 600/504 |
| 2002/0045820 A1 * | 4/2002 | Pesque | 600/443 |
| 2002/0045822 A1 * | 4/2002 | Powers et al. | 600/443 |
| 2002/0045823 A1 * | 4/2002 | Fraser | 600/443 |
| 2002/0045824 A1 * | 4/2002 | Cooley et al. | 600/443 |
| 2002/0045826 A1 * | 4/2002 | Powers et al. | 600/447 |
| 2002/0045827 A1 * | 4/2002 | Powers et al. | 600/447 |
| 2002/0045830 A1 * | 4/2002 | Powers et al. | 600/459 |

(Continued)

FOREIGN PATENT DOCUMENTS
EP    0392012 A1    10/1990
(Continued)

*Primary Examiner* — Sanjay Cattungal
(74) *Attorney, Agent, or Firm* — W. Brinton Yorks, Jr.

(57) ABSTRACT

An ultrasonic diagnostic imaging system has a two dimensional array arranged in multiple patches of multiple transducer elements. Each patch of transducer elements is coupled to a group of microbeamformer delay lines having outputs which can be coupled to a selected channel of a system beamformer, which beamforms the partially summed beams of each patch into a final beamformed signal. The ability to direct a delayed signal from a transducer element to a selected beamformer channel enables the patch boundaries to be changed as the aperture is translated across the array.

16 Claims, 10 Drawing Sheets

U.S. PATENT DOCUMENTS

| | | | |
|---|---|---|---|
| 2003/0018260 A1* | 1/2003 | Erikson | 600/447 |
| 2003/0120153 A1* | 6/2003 | Erikson | 600/447 |
| 2004/0064048 A1* | 4/2004 | Li | 600/447 |
| 2005/0148874 A1* | 7/2005 | Brock-Fisher et al. | 600/447 |
| 2005/0192499 A1* | 9/2005 | Lazenby et al. | 600/459 |
| 2005/0243812 A1* | 11/2005 | Phelps | 370/360 |
| 2005/0288588 A1 | 12/2005 | Weber et al. | |
| 2006/0211942 A1* | 9/2006 | Hoctor et al. | 600/438 |
| 2006/0241429 A1* | 10/2006 | Ustuner et al. | 600/437 |
| 2007/0016052 A1* | 1/2007 | Fukukita | 600/459 |

FOREIGN PATENT DOCUMENTS

| | | |
|---|---|---|
| WO | 2005/027747 A | 3/2005 |

* cited by examiner

LINEAR ARRAY ULTRASOUND TRANSDUCER WITH VARIABLE PATCH BOUNDARIES

This invention relates to medical diagnostic ultrasound systems and, in particular, to two dimensional array ultrasound transducers for linear array scanning with variable array patch boundaries.

Ultrasonic array transducers use beamformers to receive and appropriately delay the ultrasonic echo signals received from elements of the transducer array. The delays are chosen in consideration of the direction (steering) and focusing of the beams to be formed by the beamformer. After the signal from each element has been properly delayed by a channel of the beamformer, the delayed signals are combined to form a beam of properly steered and focused coherent echo signals. The choice of delays are known to be determinable from the geometry of the array elements and of the image field being interrogated by the beams. In a traditional ultrasound system the array transducer is located in a probe which is placed against the body of the patient during imaging and contains some electronic components such as tuning elements, switches, and amplification devices. The delaying and signal combining is performed by the beamformer which is contained in the ultrasound system mainframe, to which the probe is connected by a cable.

The foregoing system architecture for an array transducer and a beamformer suffices quite well for a one dimensional (1D) transducer array, where the number of transducer elements and the number of beamformer channels are approximately the same. When the number of transducer elements exceeds the number of beamformer channels, multiplexing is generally employed and only a subset of the total number of elements of the transducer can be connected to the beamformer at any point in time. The number of elements in a 1D array can range from less than one hundred to several hundred and the typical beamformer has 128 beamformer channels. This system architecture solution became untenable with the advent of two dimensional (2D) array transducers for three dimensional (3D) imaging. That is because 2D array transducers steer and focus beams in both azimuth and elevation over a volumetric region. The number of transducer elements needed for this beam formation is usually in the thousands. The crux of the problem then becomes the cable that connects the probe to the system mainframe where the beamformer is located. A cable of several thousand conductors of even the finest conductive filaments becomes thick and unwieldy, making manipulation of the probe cumbersome if not impossible.

A solution to this problem is to perform at least some of the beamforming in the probe itself, as described in U.S. Pat. No. 5,229,933 (Larson, III). In the ultrasound system shown in this patent, the beamforming is partitioned between the probe and the system mainframe. Initial beamforming of groups of elements is done in the probe, where partially beamformed sums are produced. These partially beamformed sums, being fewer in number than the number of transducer elements, are coupled to the system mainframe through a cable of reasonable dimensions, where the beamforming process is completed and the final beam produced. The partial beamforming in the probe is done by what Larson, III refers to as an intragroup processor, or microbeamformer in the form of microelectronics attached to the array transducer. See also U.S. Pat. No. 5,997,479 (Savord et al.); U.S. Pat. No. 6,013,032 (Savord); U.S. Pat. No. 6,126,602 (Savord et al.); and U.S. Pat. No. 6,375,617 (Fraser). The thousands of connections between the 2D transducer array and the microbeamformer is done at the tiny dimensions of the microcircuitry and the array pitch, while the cable connections between the microbeamformer and the beamformer of the system mainframe are done by more conventional cable technologies. Various planar and curved array formats can be used with microbeamformers such as the curved arrays shown in U.S. patent applications 60/706,190 (Kunkel) and 60/706,208 (Davidsen).

The microbeamformers shown in the above patents operate by forming partially delayed sum signals from contiguous element groups referred to as "patches." The signals received by all of the elements of a patch are appropriately individually delayed, then combined into the partial sum signal. A ramification of the patch approach is that aperture design is based upon the number, size and shape of the array patches. This works very well for a 2D phased array transducer, where the full array aperture is used during echo reception. But for linear array operation, where the active array aperture is translated across the 2D array, the patch size and dimensions can place constraints on aperture translation. The stepping of the active aperture is generally required to be done in patch-sized increments, for example, as shown in the aforementioned U.S. Pat. No. 6,013,032 (Savord). Accordingly it is desirable for a 2D array to be operable for aperture translation in lesser increments than the size of a full patch. It would further be desirable to be able to operate the same microbeamformer for either linear array or phased array operation.

In accordance with the principles of the present invention, a two dimensional array and microbeamformer are operated for linear array scanning of a volumetric region. The active array aperture is stepped across the array in increments smaller than the dimensions of an element patch, which can be as small as a single transducer element. The partial sum signals from more than one patch can be coupled over the same conductor to the system mainframe beamformer by use of patch and aperture configurations which do not place conflicting signals on the same conductor at the same time. Thus, the number of patches can exceed the number of cable conductors and mainframe beamformer channels, even for unmirrored (asymmetrical) apertures. In addition, the patch boundaries are variable, enabling the maintenance of an equal number of signal components for each partial sum signal. An embodiment of the present invention can allow arrays with very large numbers of elements to be used with a conventionally sized mainframe beamformer. An embodiment of the present invention may be configured for use in either linear or phased array mode of operation.

Figure 1:
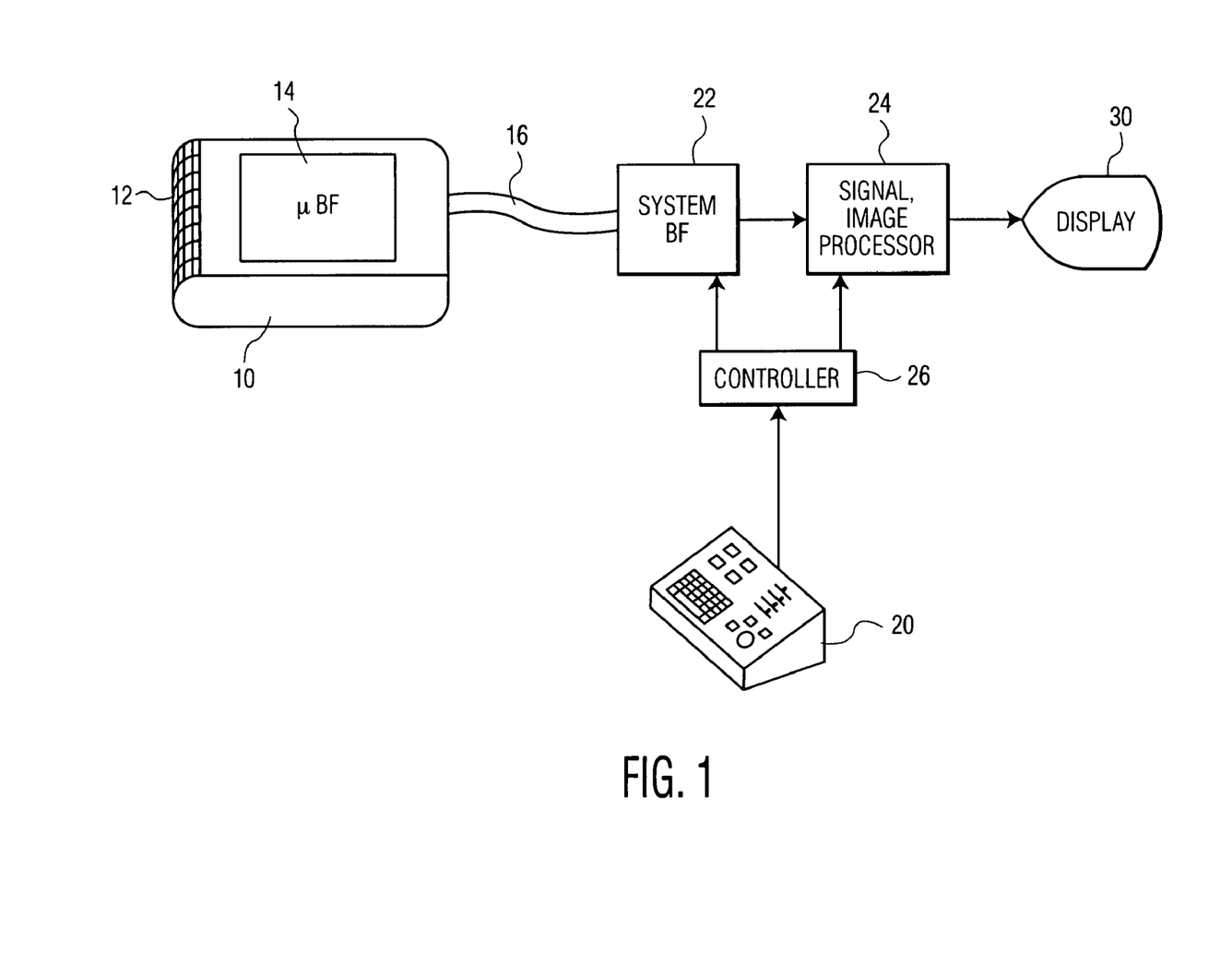
FIG. 1 illustrates in block diagram form a 2D curved array transducer and microbeamformer probe of the present invention.

Referring first to FIG. 1, an ultrasound system constructed in accordance with the principles of the present invention is shown in block diagram form. A probe 10 has a two dimensional array transducer 12 which is curved in the elevation dimension as shown in the aforementioned Davidsen patent application. The elements of the array are coupled to a microbeamformer 14 located in the probe behind the transducer array. The microbeamformer applies timed transmit pulses to elements of the array to transmit beams in the desired directions and to the desired focal points in the three dimensional image field in front of the array. Echoes from the transmitted beams are received by the array elements and coupled to channels of the microbeamformer 14 where they are individually delayed. The delayed signals from a contiguous patch of transducer elements are combined to form a partial sum signal for the patch. In the examples below combining is done by coupling the delayed signals from the elements of the patch to a common bus, obviating the need for summing circuits or other complex circuitry. The bus of each patch is coupled to a conductor of a cable 16, which conducts the partial sum patch signals to the system mainframe. In the system mainframe the partial sum signals are digitized and coupled to channels of a system beamformer 22, which appropriately delays each partial sum signal. The delayed partial sum signals are then combined to form a coherent steered and focused receive beam. The beam signals from the 3D image field are processed by a signal and image processor 24 to produce 2D or 3D images for display on an image display 30. Control of ultrasound system parameters such as probe selection, beam steering and focusing, and signal and image processing is done under control of a controller 26 which is coupled to various modules of the system. In the case of the probe 10 some of this control information is provided from the system mainframe over data lines of the cable 16. The user controls these operating parameters by means of a control panel 20.

Figure 2:
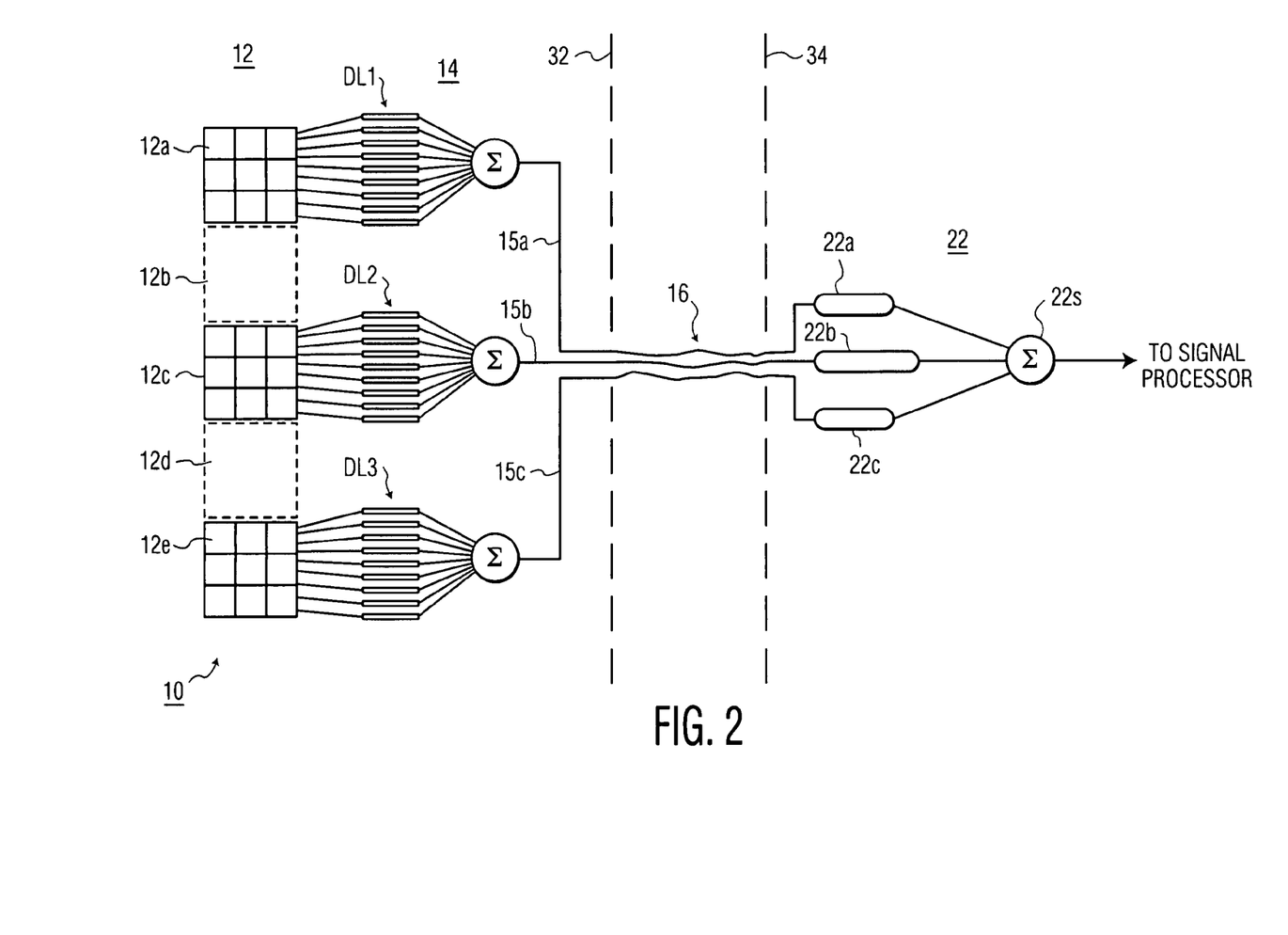
FIG. 2 is a block diagram illustrating the concept of a partial beamsum microbeamformer.

FIG. 2 illustrates the concept of a partially summing microbeamformer. The drawing of FIG. 2 is sectioned into three areas by dashed lines 32 and 34. Components of the probe 10 are shown to the left of line 32, components of the system mainframe are shown to the right of line 34, and the cable 16 is shown between the two lines. The two dimensional array 12 of the probe is divided into patches of contiguous transducer elements. Five of the patches of the array 12 are shown in the drawing, each including nine neighboring elements. The microbeamformer channels for patches 12a, 12c, and 12e are shown in the drawing. The nine elements of patch 12a are coupled to nine delay lines of the microbeamformer indicated at DL1. Similarly the nine elements of patches 12c and 12e are coupled to the delay lines indicated at DL2 and DL3. The delays imparted by these delay lines are a function of numerous variables such as the size of the array, the element pitch, the spacing and dimensions of the patch, the range of beam steering, and others. The delay line groups DL1, DL2, and DL3 each delay the signals from the elements of their respective patch to a common time reference for the patch. The nine delayed signals from each group of delay lines are then combined by a respective summer Σ to form a partial sum signal of the array from the patch of elements. Each partial sum signal is put on a separate bus 15a, 15b, and 15c, each of which is coupled to a conductor of the cable 16, which conducts the partial sum signals to the system mainframe. In the system mainframe each partial sum signal is applied to a delay line 22a, 22b, 22c of the system beamformer 22. These delay lines focus the partial sum signals into a common beam at the output of the system beamformer summer 22s. The fully formed beam is then forwarded to the signal and image processor for further processing and display. While the example of FIG. 2 is shown with 9-element patches, it will be appreciated that a constructed microbeamformer system will generally have patches with larger numbers of elements such as 12, 20, 48, or 70 elements or more. The elements of a patch can be adjacent to each other, be spaced apart, or even intermingled in a checkerboard pattern, with "odd" numbered elements combined in one patch and "even" numbered elements combined in another. The patches can be square, rectangular, diamond-shaped, hexagonal, or any other desired shape.

Figure 3:
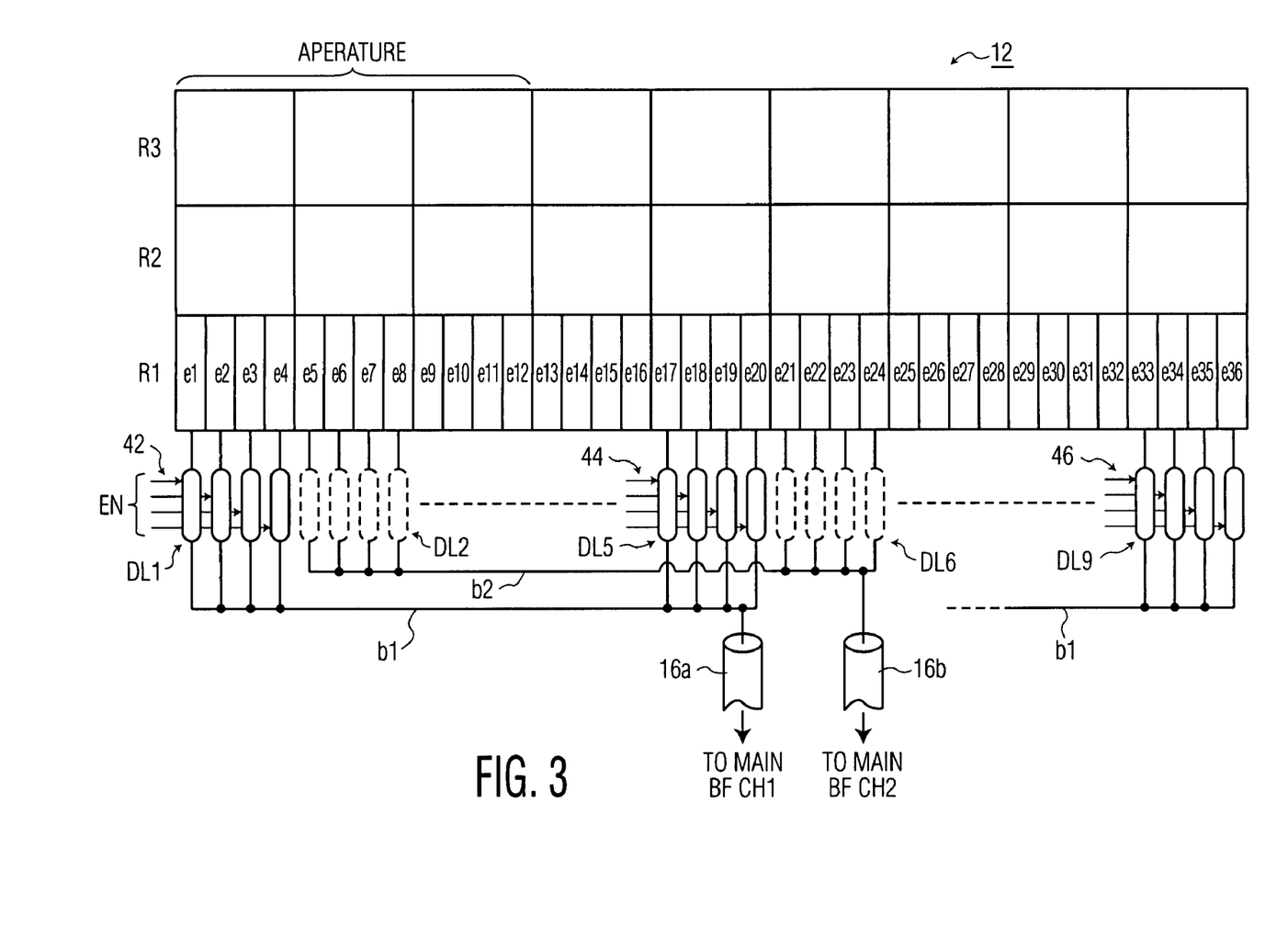
FIG. 3 is a block diagram of one example of a 2D array transducer and microbeamformer constructed in accordance with the principles of the present invention.

FIG. 3 shows another example of a two dimensional array transducer and microbeamformer of the present invention. This drawing shows three rows R1, R2, and R3 of a two dimensional array transducer 12. In this example a patch of elements consists of four elements: elements e1-e4 form one patch, elements e5-e8 form another patch, elements e9-e12 form a further patch, and so on. The elements of each patch are coupled to the delay lines of a group of microbeamformer delay lines. For example, elements e1-e4 are coupled to the four delay lines of delay line group DL1, elements e5-e8 are coupled to the delay lines of delay line group DL2, and so on. The delayed signals from a delay line group are combined on an output bus which connects the delay line outputs together. For example the four delay line outputs of group DL1 are all tied to bus b1, the four delay line outputs of group DL2 are connected to bus b2, and so on. Each bus is connected to an individual conductor of the cable 16. Bus b1 is connected to conductor 16a of the cable, and bus b2 is connected to cable conductor 16b, and so on. Each cable conductor leads to a channel of the system mainframe beamformer.

During transmit a group of elements of the array are activated to transmit the desired beam in the desired direction. The group chosen for transmit will generally be small for a near field focused beam, and can be as large as the entire array for a far field beam. The elements activated for the transmit beam, referred to as the transmit aperture, can occupy any shape or pattern of elements on the array. A zone focusing scheme, which focuses at progressively deeper focal zones, can use progressively larger transmit apertures for each deeper zone, for instance. A transmit beam can be steered straight ahead (normal to the surface of the array), or be steered at an angle to the array surface. In the probe shown in the Davidsen patent application, the beams are steered straight ahead at the interior of the array, and at outward canted angles around the periphery of the array to create a wider field of view.

The transducer array and microbeamformer of FIG. 3 can be operated as a linear array or as a phased array. Linear array operation is done by transmitting beams from apertures which are moved along the surface of the array and receiving the echoes from these beams at receive apertures which are also moved along the surface of the array. In the example shown in the drawing a receive aperture size is bracketed at the top of the drawing and in this example is seen to be three patches (twelve elements) wide. In this example the receive aperture is illustrated as being a single row (R1) high, but it could alternatively be multiple rows high. A first receive beam is received by elements e1-e12 in this example. Since this receive aperture includes the first three patches in row R1 of the array, the delay lines DL1, DL2, and DL3 (not shown) of these first three groups in the microbeamformer are enabled for this beam. The delay lines are enabled in this example by enable lines En connected to each delay line as indicated at 42, 44, and 46. The four delayed signals from elements e1-e4 and delay line group DL1 are connected to bus b1 where they are combined to form a partial sum signal from the first patch. Similarly, the four delayed signals from elements e5-e8 and delay line group DL 2 are combined on bus b2 and the four delayed signals from elements e9-e12 and delay line group DL3 are combined on bus b3 (not shown). The busses are operated as summing nodes for the formation of the partial sum signals in this example. The three buses and cable conductors conduct these partially beamformed signals to three channels of the main beamformer, where the beamformation of the beam is completed.

The next beam is acquired by stepping the receive aperture to the right in this example. The beam could be stepped by an entire patch by use of, for example, multiplexers in the cable connector or ultrasound system mainframe, resulting in the next beam being acquired by a receive aperture consisting of elements e5-e16. However this translation of an entire patch width would result in a coarse beam spacing across the image field. In this example finely spaced beams are acquired by stepping the receive aperture by less than the dimension of a full patch, and preferably by a single element width. The next beam is thus acquired by elements e2-e13. Since the signal from element e1 does not contribute to this beam, the enable line to the microbeamformer delay line for this element disables this delay line from contributing to this next beam. Only the delayed signals from elements e2-e4 are combined on bus b1. Since the signal from element e13 is contributing to this beam, the microbeamformer delay line for this element is enabled and the delayed signal placed on the bus b4 (not shown) for that delay line group. The partial sum signals on four buses are coupled to the main beamformer for completion of the beamformation process: three combined signals on bus b1 from elements e2-e4, four combined signals on buses b2 and b3, and the signal from element e13 on bus b4. Apodization weighting is employed in the main beamformer to account for the unequal signal weighting on the different buses.

The stepping of the receive aperture across the array continues in this manner. The next beam uses elements e3-e14 for the receive aperture, the following beam uses elements e4-e15, and the subsequent beam uses elements e5-e16 for reception. As this stepping occurs it is seen that the delay lines of the first patch DL1 are progressively disabled while the delay lines of the fourth patch which are connected to elements e13-e16 are progressively enabled. The last of these beams is seen to use no elements from the first patch. With the next beam step to an aperture of elements e6-e17 it is seen that the first delay line of delay line group DL5 is enabled. The outputs of this fifth delay line group are in this example connected to bus b1, for it is seen that the aperture at no time uses elements from both the first and fifth patches for the same beam. Thus, as the delay lines of the first patch become fully disabled, the delay lines of the fifth delay line group DL5 begin using the same bus b1 previously used by delay line group DL1. These two groups cannot use the same bus at the same time because their partial sum signals require different delays for beamformation in the main beamformer. If these partial sum signals were combined on a common bus, they could not be subjected to the necessary delay difference in their processing. Thus, by considering the apertures used by the array, multiple patches can be connected to the same cable conductors to the main beamformer, which means that the number of patches can exceed the number of conductors in the cable. A greater number of array patches can therefore be accommodated by a given cable and system beamformer. With the ability to increase the number of patches for a given array, the size of the patches can be decreased, thereby reducing the delay lengths needed in the microbeamformer.

In this example it is seen that the delay line group DL9 for the patch at the right side of the array can also be connected to bus b1. The delay line group DL5 is progressively disabled as the delay line group for elements e29-e32 are progressively enabled. After delay line group DL5 is fully disabled, the aperture progresses to the right as the delay lines of group DL6 are progressively disabled and the delay lines of group DL9 are progressively enabled. Since both groups DL1 and DL5 are disabled during this later stepping of the aperture, delay line group DL9 can be connected to and is free to use bus b1 at this time.

The receive aperture will continue to step across the array in this manner which, in this example, will acquire twenty-five different beams at twenty-five different beam locations before the aperture reaches the right side of the array. This stepping process can then be repeated across the second row R2 of the array and then the third row R3. In this manner a volumetric field in front of the array is scanned for 3D imaging. Variations to the illustrated aperture will readily occur to those skilled in the art. For instance, an aperture can be more than a single row high. An aperture could begin with elements e1-e12 of the first row R1 and the first twelve elements of row R2. This twenty-four element aperture can be stepped across the array, then stepped up by one row. The next translation would begin with the first twelve elements of each of rows R2 and R3 as the active aperture, which would then step across the array. Various aperture translation patterns can also be employed. For instance, the active aperture can begin at the bottom of the array and step to the top, then across and back down the array, and so on in this manner. A translation sequence which steps the aperture across and up in a roughly diagonal direction can also be employed. Aperture translation patterns can be chosen to minimize motion artifacts in regions of the image field, for instance.

Figure 4:
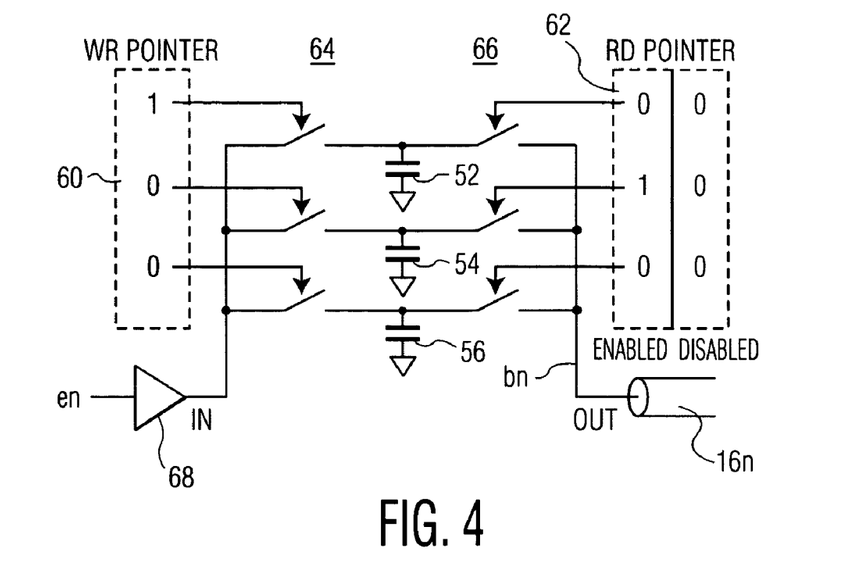
FIGS. 4, 5, and 6 illustrate detailed examples of a microbeamformer delay line.

The delay lines of a system of the present invention can be either digital or analog delay lines, depending upon whether the signals are digitized prior to the delay lines. A preferred analog delay line is shown in FIG. 4. This delay line is formed by coupling successive signals from a transducer element to capacitors of a capacitor bank. Three capacitors 52, 54, 56 of such a capacitor bank are shown in FIG. 4. The number of capacitors in the capacitor bank is chosen in consideration of the maximum length of delay needed and the sampling rate used. A longer delay and/or finer resolution (e.g., to satisfy the Nyquist criterion) requires a greater number of capacitors. The time delay of the delay line is effected by writing a voltage sample from the transducer element $e_n$ onto a capacitor at an earlier time, then reading the voltage sample from the capacitor at a later time, the incremental time between writing and reading providing the delay time. The capacitor bank can be arranged in a parallel configuration as shown in FIG. 4, or in a serial configuration in the manner of a CCD charge bucket brigade as discussed in U.S. Pat. No. 6,126,602 (Savord et al.)

In the configuration of FIG. 4 the echo signals from a transducer element $e_n$ are applied by way of a buffer amplifier 68 to the inputs of a bank of input switches 64. The closure of each switch is controlled by a control signal from a write pointer 60. For instance, a first signal sample may be stored on capacitor 52 by momentary closure of its input switch, a second sample is stored on capacitor 54, a third sample is stored on capacitor 56 and so on. At a later time determined by the desired delay time the samples are read from the capacitors in sequence determined by control signals from a read pointer 62 which control an output bank of switches 66. In the illustrated example an echo signal sample is being written to capacitor 52 while and echo signal sample is being read from capacitor 54. As an output switch is closed the signal sample on the capacitor is applied to the output bus bn which conducts the signal to the cable conductor 16$n$. While samples from the delay line of FIG. 4 are being applied to the output bus bn, samples from other delay lines of the patch delay line group are simultaneously being applied to the same bus bn. The simultaneous application of the signals thus results in a summation of the delayed samples from the elements of the patch.

Figure 5:
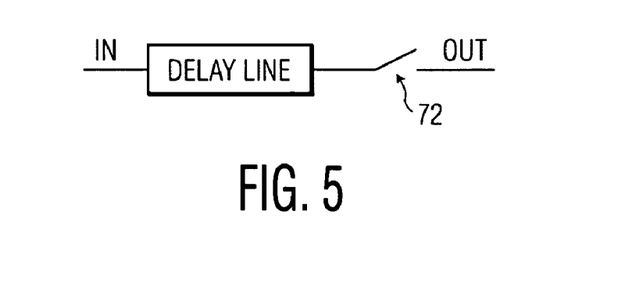
Figure 6:
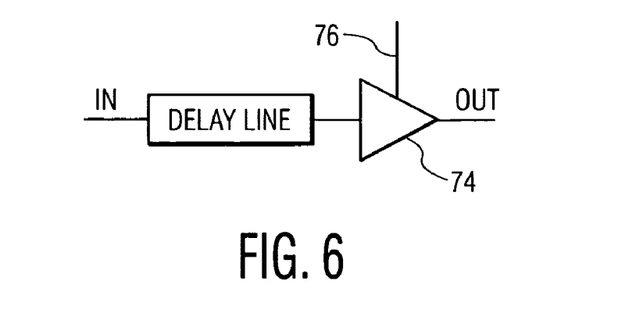

In accordance with the principles of the present invention, in the example of FIG. 4 the read pointer 62 may be set with all zeroes as shown on the right side of the read pointer. With this setting the delay line is disabled, since no signal samples from the element $e_n$ are applied to the output bus bn. Other techniques may alternatively be employed to prevent signals from an array element from being put on the bus. In the example of FIG. 5 a single switch 72 such as a passgate is used at the output of the delay line. This configuration is suitable for use for either a parallel or serial configured delay line. Another technique shown in FIG. 6 is to use a tristate buffer 74. The tristate buffer 74 is controlled by a control line 76 to either transmit the input signal from the delay line to the tristate buffer output, or set the tristate buffer to exhibit a high output impedance. In one setting of the control line 76 the tristate buffer will produce a high or low voltage or current signal as determined by the echo signal, or a high (e.g., open circuit) impedance output. Passgates and tristate buffers may be readily implemented in microcircuitry suitable for use in a microbeamformer.

Figure 7:
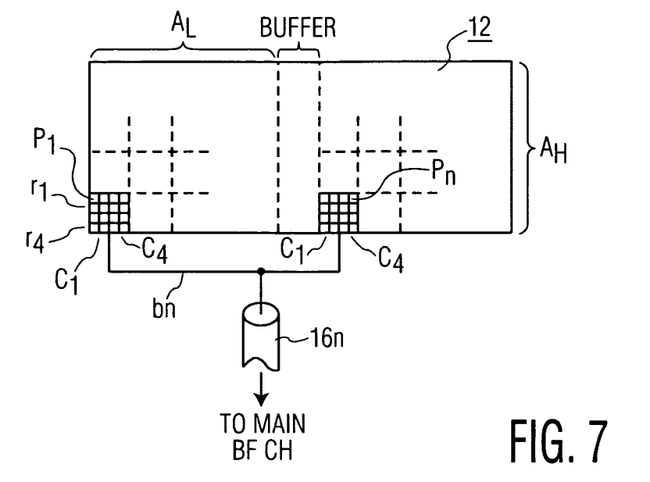
FIG. 7 is a second example of a 2D array transducer and microbeamformer constructed in accordance with the principles of the present invention.

FIG. 7 illustrates a design for a two dimensional array and microbeamformer combination of the present invention which has two patches bussed to the same main beamformer channel. In this example the microbeamformer delay channels of two patches, $P_1$ and $P_n$, are coupled to a common bus bn, which is coupled by a cable conductor 16$n$ to a channel of the mainframe beamformer. FIG. 7 is a top plan view of the two dimensional array, with the microbeamformer attached to the bottom of the array and not visible in this drawing. Each patch in this example comprises sixteen elements arranged in a 4 row ($r_1$-$r_4$) by 4 column ($c_1$-$c_4$) patch. Thus, thirty-two transducer elements are connected to the same main beamformer channel in this example. Since patches $P_1$ and $P_n$ share the same beamformer channel, the elements of only one of these two patches can use bus bn at any given time. This means that a "buffer" of elements of the length of three columns of elements must separate the maximum aperture length from the second interconnected patch $P_n$, as shown by the bracket marked "buffer." The maximum receive aperture size will thus have a maximum length of $A_L$ and a maximum height of $A_H$ as shown in the drawing. For instance, an initial receive aperture can include the elements of patch $P_1$ and all of the elements of the patches up to the left side of the buffer region. As this aperture is stepped to the right, columns $c_1$ to $C_4$ of patch $P_1$ are successively disabled with each step as the corresponding four columns of the elements in the buffer region are successively enabled. At the end of the third step of this four-beam step, only the elements of column $C_4$ of patch $P_1$ will be enabled and all three columns of elements of the buffer region will be enabled and contributing to the active aperture. With the next rightward step of the aperture, the last column $C_4$ of patch $P_1$ will be turned off and the first column $c_1$ of patch $P_n$ will be turned on. The active aperture at this moment will thus consist of all of the elements to the right of patch $P_1$ and through and including the first column of patch $P_n$. Thus, there is never a time when elements from both commonly bussed patches are using the bus at the same time. The design rule for this example is that the size of the buffer region is at least equal to the number of columns of a patch minus one.

In this example patches in the height dimension do not share the same bus. Thus, there is no restraint on the maximum size of the active aperture in the height dimension. The maximum aperture size in the height dimension, $A_H$, may thus be equal to the full height dimension of the two dimensional array.

Figure 8:
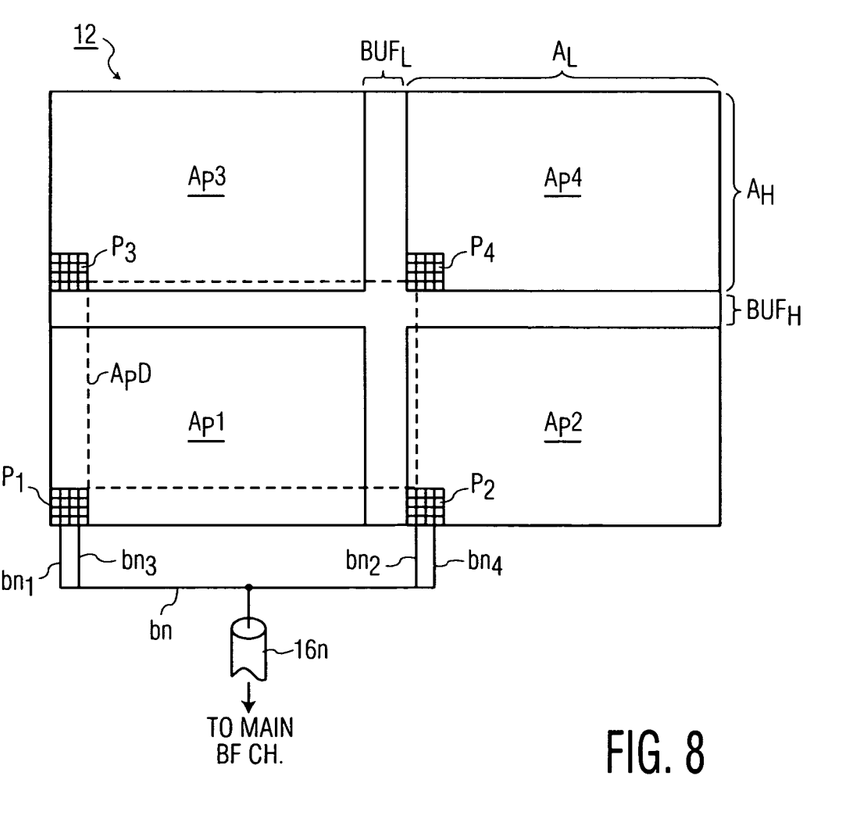
FIG. 8 is a third example of a 2D array transducer and microbeamformer constructed in accordance with the principles of the present invention.

FIG. 8 illustrates a design for a two dimensional array in which four patches share the same main beamformer channel. As in FIG. 7, the two dimensional array 12 of FIG. 8 is shown in a top plan view with the microbeamformer located beneath the array. Four patches $P_1$, $P_2$, $P_3$, and $P_4$ are all coupled to bus bn by buses $bn_1$, $bn_2$, $bn_3$, and $bn_4$, respectively. Simultaneously present signals are summed on the bus and coupled to a channel of the main beamformer by conductor 16$n$ of the cable 16. The maximum receive aperture of the array exhibits dimensions of $A_L$ and $A_H$. The maximum aperture is shown when positioned at the corners of the array as apertures Ap1, Ap2, Ap3, and Ap4. The maximum aperture positions are separated by a buffer region of $buf_L$ in the length dimension and a buffer region of $buf_H$ in the height dimension. The horizontal length of the $buf_L$ region is one element less than the horizontal length of a patch and the vertical height of the $buf_H$ region is one element less than the vertical height of a patch. In a case where the patches and the elements are square these regions will be of the same size. In a case where the patch dimensions and/or the element dimensions are not square these region sizes will differ. In the example of FIG. 8 it is seen that, as the receive aperture starts from position Ap1 and is stepped to the right, columns of the $P_1$ patch (and all patches above it in the aperture) are successively disabled as columns of elements in the $buf_L$ region are successively enabled. As the aperture is stepped fully to the right of patch $P_1$ and the entire patch is disabled, the leftmost column of the commonly bussed patch $P_2$ is enabled. The active aperture continues to be stepped to the right in this manner, with the final aperture location as shown by Ap2. Thus, there is never a time when elements from patches $P_1$ and $P_2$ are enabled at the same time. Commonly bussed patches $P_3$ and $P_4$ are disabled at this time since the uppermost extent of the active aperture is below these patches. While the maximum height of the active aperture is shown as $A_H$ in this example, it will be realized that this dimension can be increased by the height of the $buf_H$ region in the case where the aperture is being stepped to the right.

Thereafter, or alternatively, the aperture may be stepped upward from the Ap1 position. As the aperture is stepped up a patch row at a time, the rows of elements of patch $P_1$ are successively disabled from the bottom to the top, and rows of elements in the $buf_H$ region above the aperture area Ap1 are successively enabled in correspondence. After (m−1) such steps only the upper row of patch $P_1$ (and all patches to the right of patch $P_1$ in the aperture) will be enabled and all (m−1) rows of elements in the $buf_H$ region above the aperture area Ap1 will be enabled. With the next aperture step (bringing the step total to m), all m rows of patch $P_1$ will be disabled and the first row of patch $P_3$ will be enabled, along with all of the rows of the $buf_H$ region in the aperture. Thus, there is never a time when elements from both patches $P_1$ and $P_3$ are contributing to the beam. Upward stepping of the aperture continues in this manner until the aperture reaches its upper limit of location Ap3. As in the case of horizontal translation, it will be realized that the length of the aperture in this situation could be equal to $A_L$ plus the length of $buf_L$.

Allowing for a buffer region in both the horizontal and vertical (height and length) dimensions allows translation of the maximum aperture in any direction, including diagonal translation. For example, the aperture may be stepped diagonally from position Ap1 by simultaneously moving the aperture to the right and up one element in each step. The aperture can continue to be moved diagonally in this manner to a final aperture position Ap4. As indicated by the dashed aperture outline ApD, with a maximum aperture size of $A_L$ by $A_H$ and buffer regions as shown, only elements from a single patch will contribute to the signals on bus bn at any point in time during this aperture translation. The dashed outline ApD shows the aperture just after leaving the location where only the upper right corner element of patch $P_1$, of the four commonly bussed patches, contributed to the signals on bus bn, and now located at a location where only the lower left corner element of patch $P_4$ contributes to the signals on bus bn. The example of FIG. 8 enables horizontal, vertical, and diagonal stepping of a maximum receive aperture in a two dimensional microbeamformed array in which the number of patches is (with the exception of the buffer dimensions) four times the number of cable conductors and main beamformer channels. The 4:1 pattern of patches to main beamformer channels can be extended symmetrically throughout the two dimensional array of FIG. 8. With even larger ratios of array size to maximum aperture size, greater numbers of patches can be interconnected, as shown by the common connection of three patches in the horizontal dimension in the example of FIG. 3.

Figure 9:
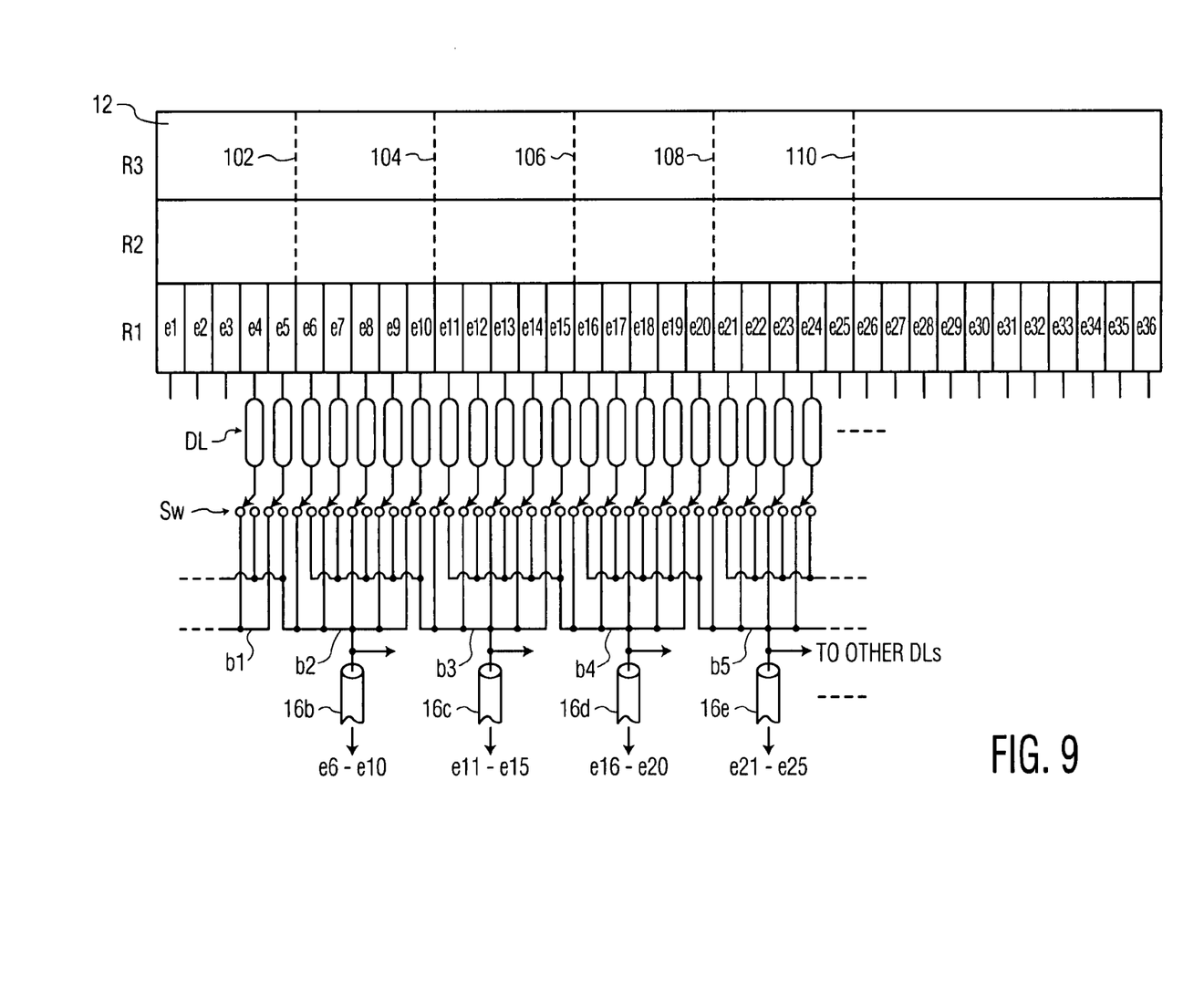
FIGS. 9, 12, 13, and 14 illustrate a further example of the present invention in which the boundaries of a patch are made arbitrary.

The switching elements shown in FIGS. 4, 5, and 6 are functionally equivalent to single pole, single throw switches. The following examples of the present invention use the functional equivalent of single pole, double throw switches to shift the receive aperture. These examples provide the benefit that the patch boundaries are effectively repositioned as the aperture is shifted. A further benefit of the following examples is that an identical number of element signals can be maintained for each main beamformer channel, obviating the need to perform apodization weighting adjustment for channels with different numbers of signals. FIG. 9 shows one such example, using the same two dimensional array configuration as FIG. 3. The delay lines DL for each element in row R1 are shown attached to the respective elements of row R1. A single pole, double throw switching element Sw is connected at the output of each delay line DL. The outputs of these switching elements connect the delay lines to one of two possible busses, cable conductors, and main beamformer channels, depending upon the setting of the switch arm. In this example each patch consists of five elements, and when the switches Sw are set as shown in FIG. 9 it is seen that the delay lines for elements e6-e10 are all coupled to bus b2 which sums the signals from those five elements. The patch of these five elements is indicated by dashed lines 102, 104 extending across the two dimensional array 12. The summed signal on bus b2 is coupled by cable conductor 16b to a channel of the main beamformer for the completion of beam formation. Similarly, the patch consisting of elements e11-e15 between dashed lines 104, 106 has its received signals coupled to and summed on bus b3, then coupled by cable conductor b3 to a main beamformer channel. In like manner five-element patch signals are summed on busses b4 (e16-e20) and b5 (e21-e25) and coupled over conductors 16d and 16e to main beamformer channels. The arrows below the busses indicate connections to the delay lines from other patches which share the same busses and main beamformer channels at other times in the aperture shifting. It is seen in this example that each bus is summing the signals from a full complement of five elements, the size of a patch used in this example.

Figure 10:
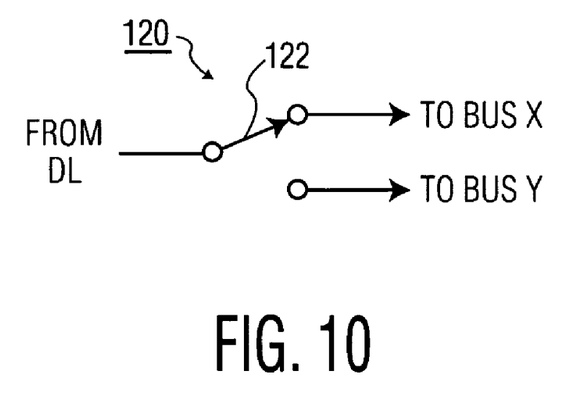
FIGS. 10 and 11 illustrate switch configurations suitable for use in the examples of FIGS. 9, 12, 13, and 14.
Figure 11:
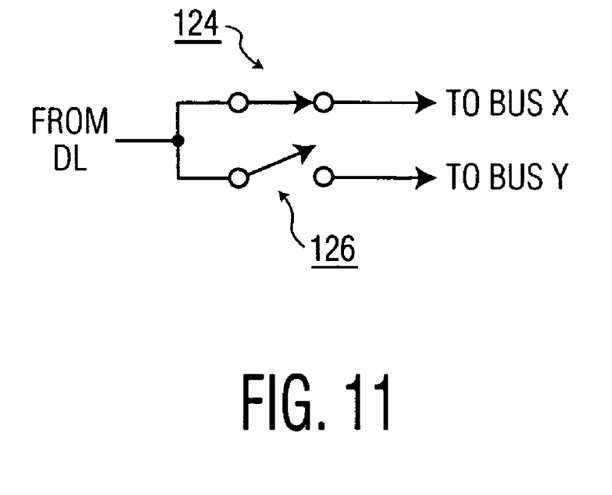

The switching elements Sw are functionally equivalent to single pole, double throw switches. That is, the output of a delay line is coupled to one of two output busses and main beamformer channels, depending upon the setting of the switch. This arrangement makes the boundaries of a patch entirely arbitrary, depending upon the setting of a switch. FIG. 10 illustrates a basic form of a single pole, double throw switch 120, with the arm 122 determining whether the signal from a delay line DL is coupled to bus x or bus y. FIG. 11 illustrates another example, in which the function of a single pole, double throw switch is provided by two parallel single pole, single pole switches 124 and 126. In the example of FIG. 9 a full complement of elements equal to the number of elements forming a full patch, five in this example, are coupled to each main beamformer channel. The setting of the switch Sw for a particular element determines the main beamformer channel to which the element is coupled and hence the patch group of which the element is a contributor at a given point in time.

Figure 12:
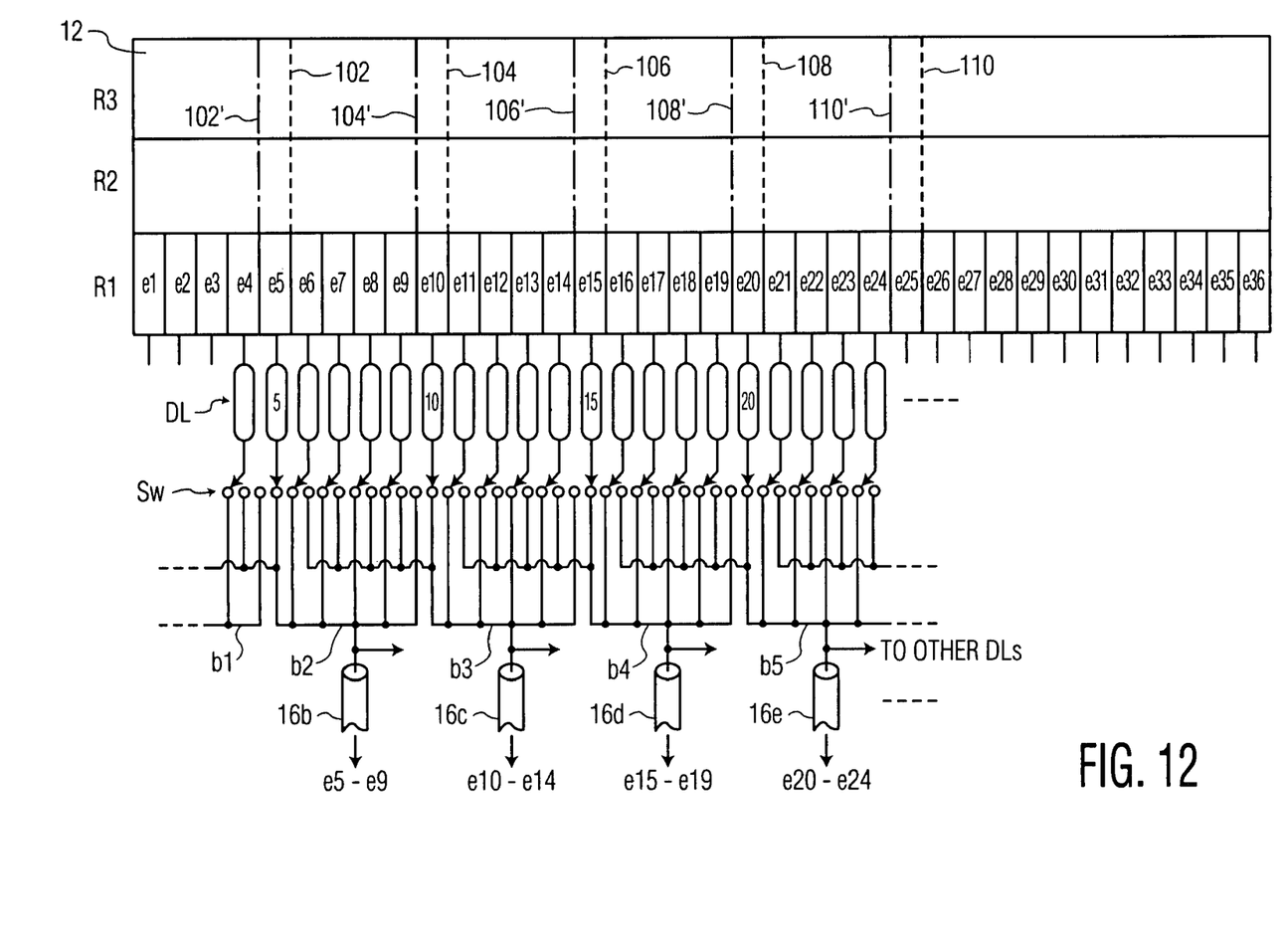

FIG. 12 illustrates the configuration of FIG. 9 after the aperture has been shifted one element to the left, as indicated by the dashed lines 102', 104', etc. in relation to the original patch boundary lines 102, 104, etc. The switch Sw for delay line 5 has been reset to its alternate setting, coupling the signal from delay line 5 to conductor 16b. The switch Sw from delay line 10 has also been reset, redirecting the signal from delay line 10 from conductor 16b to conductor 16c. Similarly, the switches Sw for each fifth delay line, including illustrated delay lines 15 and 20, have been reset to their alternate settings. These switch settings combine the signals from elements e5-e9 on conductor 16b, the signals from elements e10-e14 on conductor 16c, the signals from elements e15-e19 on conductor 16d, and so forth. Compared to the signals on the conductors in FIG. 9, it is seen that the element groupings on each conductor have been shifted to the left by one element and hence the entire aperture has been shifted to the left by one array element.

Figure 13:
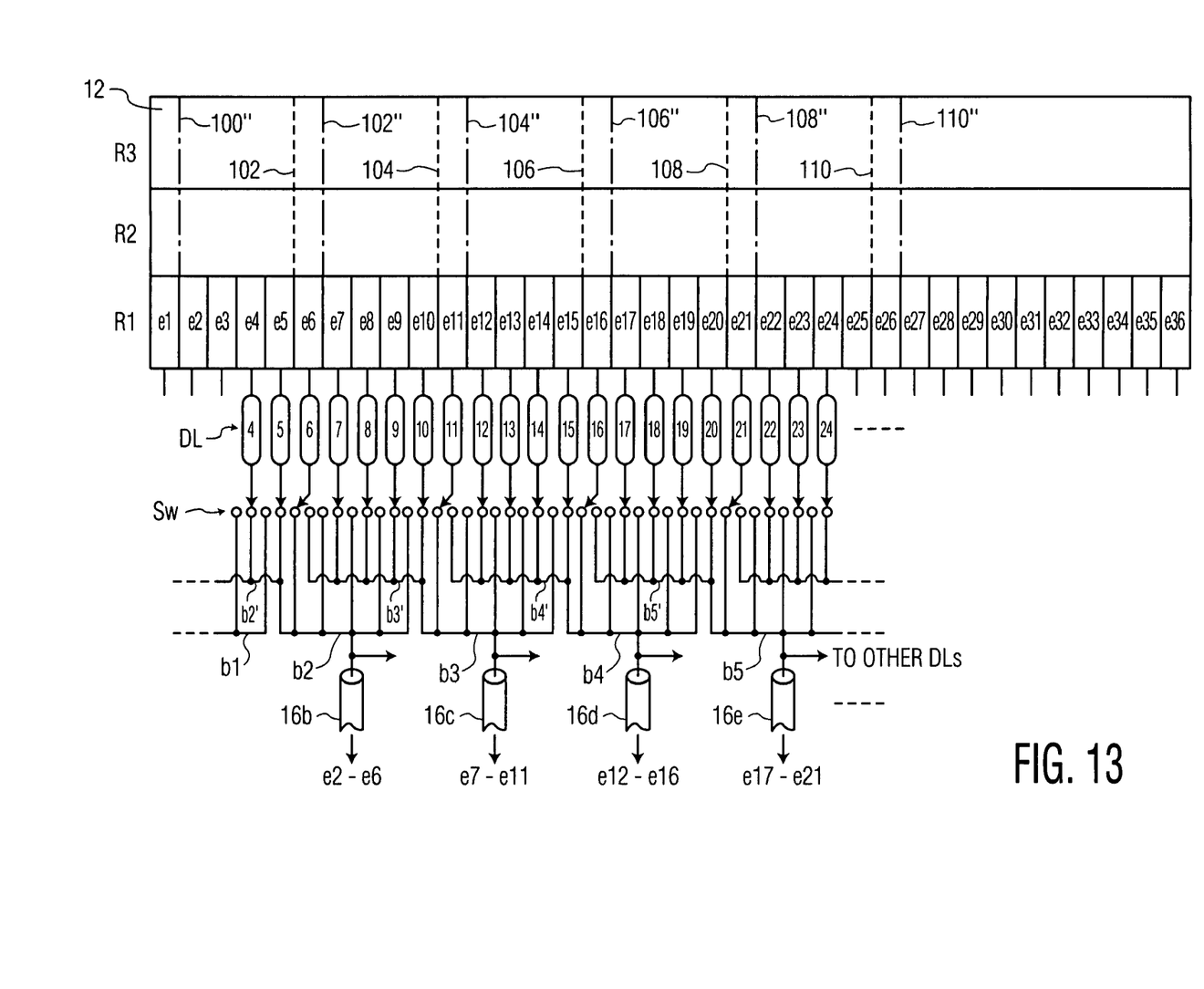

In FIG. 13 the aperture is shifted one element to the right in relation to its starting position in FIG. 9, as indicated by patch boundaries 100", 102", 104", 106", etc. Only illustrated switches Sw for delay lines 6, 11, 16, and 21 are in their original settings; all of the other switches have been reset. This resetting causes the signals from delay lines 7, 8, and 9 to be coupled to the extension b3' of bus b3 instead of their previous coupling to bus b2. As a result, the signals from elements e7-e11 are now combined on bus b3 and coupled to a main beamformer channel by way of conductor 16c. Similarly, the signals from elements e2-e6 are coupled to conductor 16b, the signals from elements e12-e16 are coupled to conductor 16d, and so forth. It may be seen that each patch grouping on a conductor has been shifted to the right by one element compared to the original settings, and hence the entire aperture has been shifted to the right by one element.

Figure 14:
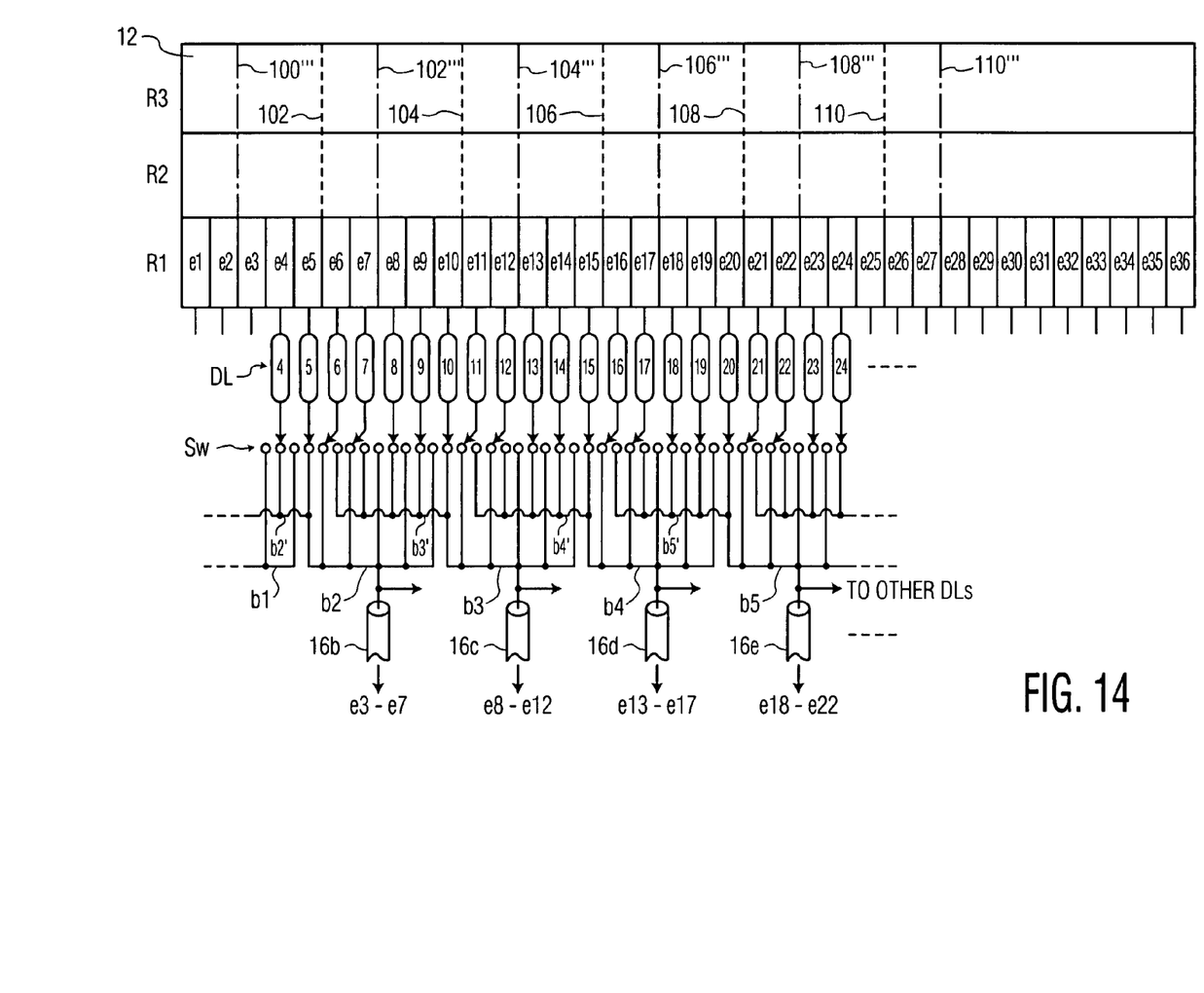

FIG. 14 illustrates the switch Sw settings when the aperture is shifted another element to the right in relation to FIG. 13. The switch Sw positions of FIG. 14 differ from those of FIG. 13 in that the switches for delay lines 7, 12, 17, and 22 have been reset to their alternate settings. This causes the signals from elements e3-e7 to be directed to conductor 16b, the signals from elements e8-e12 to be directed to conductor 16c, the signals from elements e13-e17 to be directed to conductor 16d, and so forth. The entire aperture has been shifted to the right by another element as indicated by dashed lines 100''', 102''', 104''', and so on.

By setting the switches Sw from delay lines 8, 13, 18, and 23 in the next iteration, it will be seen that the aperture is shifted to the right by a further element. The aperture can be shifted across the array in this manner. In every case it is seen that, with the exception of the physical edges of the array, an equal complement of element signals is always present at each main beamformer channel at each aperture position. This technique can be used with a one dimensional array for which the aperture is to be shifted in only one direction, the azimuth direction. The technique can be employed to additionally shift the aperture in the orthogonal (elevation) direction on a two dimensional array by, for instance, adding an orthogonally configured single pole, double throw switch parallel to the first one, or using a single pole, 3-throw switch or its equivalent for each element. To accommodate diagonal translation in addition to azimuth and elevation translations, a single pole, 4-throw switch or its equivalent can be used to connect an element to any one of four possible cables and main beamformer channels. Each output of the single pole, n-throw switch is connected to a different cable conductor and hence a different main beamformer channel.

In many linear array implementations the beams are always (or most of the time) steered straight ahead, normal to the surface of the array. When there is no off-axis steering in such a straight-ahead beam steering implementation the aperture delays can be symmetrical about the center of the aperture. This means that patches at an equal distance on either side of the aperture center use the same main beamformer delay and hence can be coupled to the same main beamformer channel. One skilled in the art will realize that such an implementation does not need to use the buffer regions discussed above due to such symmetry. The coupling of separated patches to the same main beamformer channel should be done in consideration also of the phased array requirements for the system, as the steering of beams in three dimensions requires continuous delay differentiation across the phased array aperture.

Various applications and modifications of the above principles of the present invention will readily occur to those skilled in the art. As previously mentioned, the 2D array transducer can be planar (flat), or bent or curved in one or several dimensions. Digitizing of the echo signals can be performed in the probe or in the system mainframe. Amplification can be employed in either the probe, the system mainframe, or both. The microbeamformer circuitry shown above for echo reception can also be used in part for transmit beamforming. Additional modification are within the scope of the present invention.

What is claimed is:

1. An ultrasonic diagnostic imaging system for imaging a volumetric region with a sequence of translated receive apertures comprising:
    an array of transducer elements, located in an ultrasound probe, local groups of which can comprise patches of elements having one or more sizes;
    a multi-channel beamformer, located in a system mainframe, and producing a beamformed output signal from summed partial sum signals;
    a microbeamformer including a plurality of delay lines, located in the ultrasound probe and coupled to elements of the patches, each delay line having an input coupled to an array element and an output producing a delayed signal which is summed with other delayed signals in the microbeamformer to produce a partial sum signal which is directed to a selected one of a plurality of channels of the multi-channel beamformer; and
    a source of control signals, coupled to the probe microbeamformer, which act to control the direction of delay line outputs to channels of the mainframe multi-channel beamformer,
    wherein a receive aperture formed by the elements of multiple patches may be stepped from one aperture location of the transducer array for one beam to another aperture location of the transducer array for another beam while maintaining the same patch size or sizes.

2. The ultrasonic diagnostic imaging system of claim 1, wherein the outputs of delay lines coupled to elements of different patches are coupled to a common channel of the multi-channel beamformer.

3. The ultrasonic diagnostic imaging system of claim 1, wherein the outputs of the delay lines are coupled to selected channels of the multi-channel beamformer by the functional equivalent of switches.

4. The ultrasonic diagnostic imaging system of claim 3, wherein the outputs of the delay lines are coupled to selected channels of the multi-channel beamformer by the functional equivalent of single pole, double throw switches.

5. The ultrasonic diagnostic imaging system of claim 1, wherein the delayed and summed signals from the elements of a given patch are directed to a common mainframe beamformer channel.

6. The ultrasonic diagnostic imaging system of claim 1, wherein a receive aperture formed by the elements of multiple patches may be stepped from one aperture location of the two dimensional array for one beam to another aperture location of the two dimensional array for another beam in a step increment of less than the size of the largest patch size.

7. The ultrasonic diagnostic imaging system of claim 6, wherein a receive aperture formed by the elements of multiple patches may be stepped from one aperture location of the transducer array for one beam to another aperture location of the transducer array for another beam in a step increment of the size of one element.

8. The ultrasonic diagnostic imaging system of claim 1,
    wherein the array of transducer elements extends in a given direction, and
    wherein a receive aperture formed by the elements of multiple patches may be stepped in the given direction from one aperture location of the array for one beam to another aperture location of the array for another beam while maintaining the same patch size or sizes.

9. The ultrasonic diagnostic imaging system of claim 8, wherein the array of transducer elements comprises a one dimensional array with the given direction comprising the azimuth direction.

10. A method of translating a receive aperture of an array of ultrasonic transducer elements, the aperture being a group of elements, the elements of the aperture being arranged in local groups of patches with a patch having defined boundaries, the signals of the elements of a patch being delayed and summed by a probe microbeamformer to form a partial sum signal, and each partial sum signal being coupled to a different channel of a multi-channel beamformer comprising:
    receiving signals from the elements of an aperture including a given number of patches of one or more predetermined sizes which is located in a first location on the transducer array;
    forming partial sum signals from the signals of the elements of each patch in the aperture in the probe microbeamformer;
    coupling the partial sum signals to channels of a mainframe multi-channel beamformer;
    translating the aperture from the first location to a partially overlapping second location which is translated in a selected direction from the first location by redefining the patch boundaries to delineate the same number of patches of the same predetermined size or sizes at the second location;

receiving signals from the elements of the redefined patches;

forming partial sum signals from the signals of the elements of each patch in the translated aperture in the probe microbeamformer; and coupling the partial sum signals to channels of the mainframe multi-channel beamformer.

11. The method of claim 10, wherein redefining the patch boundaries comprises redirecting the signals of a plurality of elements to different channels of the multi-channel beamformer.

12. The method of claim 10, wherein forming partial sum signals further comprises:

delaying the signals received from the elements of the patches of the aperture; and combining the delayed signals of the elements of each patch at a summing node.

13. The method of claim 12, wherein forming partial sum signals is performed by a microbeamformer located in the same enclosure as the transducer array.

14. The method of claim 10, wherein all of the patches include the same number of transducer elements; and wherein each partial sum signal includes the signals received from the same number of transducer elements.

15. The method of claim 12, wherein multiple patches share the same summing node.

16. The method of claim 10, wherein the partial sum signals are from beams steered normal to the two dimensional array surface;

wherein the partial sum signals are formed at summing nodes; and wherein a plurality of the partial sum signals are formed by multiple patches of the aperture sharing the same summing node.

* * * * *